United States Patent
Kochanowski et al.

(10) Patent No.: US 6,378,207 B2
(45) Date of Patent: Apr. 30, 2002

(54) FLYWHEEL FOR RECIPROCATING-PISTON ENGINE

(75) Inventors: Hans Alfred Kochanowski; Herbert Matheis, both of Ruhstorf (DE)

(73) Assignee: Motorenfabrik Hatz GmbH & Co. KG, Ruhstorf (DE)

(*) Notice: Subject to any disclaimer, the term of this patent is extended or adjusted under 35 U.S.C. 154(b) by 0 days.

(21) Appl. No.: 09/170,682

(22) Filed: Oct. 13, 1998

Related U.S. Application Data

(63) Continuation of application No. PCT/EP97/01227, filed on Mar. 11, 1997.

(30) Foreign Application Priority Data

Apr. 13, 1996 (DE) .......................... 196 14 679

(51) Int. Cl.$^7$ .......................... B21D 53/26; G05G 1/00; G05G 3/00
(52) U.S. Cl. .......................... 29/894; 74/572; 74/574; 29/434; 29/407.08; 464/68
(58) Field of Search .......................... 74/572–574; 464/68; 192/200, 70.16; D15/148; 29/894, 434, 407.08

(56) References Cited

U.S. PATENT DOCUMENTS

| | | | | |
|---|---|---|---|---|
| 1,264,642 A | * | 4/1918 | Harley | |
| 4,354,370 A | * | 10/1982 | Ullman | 72/42 |
| 4,414,836 A | * | 11/1983 | Saunders | 72/349 |
| 4,532,793 A | * | 8/1985 | Bezold | 72/342 |
| 4,558,773 A | * | 12/1985 | Schafer | 192/106.1 |
| 4,572,587 A | * | 2/1986 | Komp et al. | 29/159.1 X |
| 4,783,895 A | * | 11/1988 | Reik | 29/434 |
| 5,191,810 A | * | 3/1993 | Craft et al. | 74/572 |
| 5,323,665 A | * | 6/1994 | Rediker | 464/68 |
| 5,465,635 A | * | 11/1995 | Kono et al. | 74/574 X |
| 5,515,745 A | * | 5/1996 | Tsuruta et al. | 192/200 X |
| 5,553,693 A | * | 9/1996 | Schoder et al. | 29/889.5 X |
| 5,575,183 A | | 11/1996 | Schierling | |
| 5,649,348 A | * | 7/1997 | Jackel et al. | 29/407.08 |
| 5,799,766 A | * | 9/1998 | Link et al. | 192/70.16 |
| D402,995 S | * | 12/1998 | Hakamata | D15/148 |
| 5,966,996 A | * | 10/1999 | Hamaekers | 74/574 |
| 5,979,594 A | * | 11/1999 | Doman | 74/572 X |

FOREIGN PATENT DOCUMENTS

| | | | | |
|---|---|---|---|---|
| DE | 4204342 C1 | * | 8/1993 | 74/574 |
| EP | 0 140 576 | | 9/1984 | |
| EP | 0 385 752 | | 2/1990 | |
| EP | 0 717 211 A1 | | 12/1995 | |
| JP | 55142147 | | 11/1980 | |
| JP | 2000-508412 | * | 7/2000 | 74/574 |

* cited by examiner

*Primary Examiner*—Vinh T. Luong
(74) *Attorney, Agent, or Firm*—Rosenman & Colin LLP

(57) ABSTRACT

In a flywheel assembled from a plurality of parts and having greatly reduced noise proportion for reciprocating-piston engines, especially hand-cranked diesel engines, a first part (17) comprises at least one steel plate, which is joined to at least one further part (22) by rivets, bolts, spot welds and/or fitting to achieve bearing contact therewith over an area, such that the parts are clamped against each other.

1 Claim, 3 Drawing Sheets

FLYWHEEL FOR RECIPROCATING-PISTON ENGINE

CROSS-REFERENCE TO RELATED APPLICATIONS

This is a continuation of application Ser. No. PCT/EP97/01227 filed on Mar. 11, 1997.

BACKGROUND OF THE INVENTION

1. Field of the Invention

The invention relates to a flywheel constructed from a plurality of parts for reciprocating-piston engines, especially hand-cranked diesel engines, and to a process for making same.

2. Description of the Prior Art

Such flywheels are normally made of gray cast iron. Additional parts such as a blower ring or a magnetic segmented ring or a starter ring gear can also be joined to the actual flywheel body.

In such a flywheel, a certain degree of damping of structure-borne sound is already provided by the joint surfaces. One known reason for conduction of structure-borne sound into the flywheel is the crankshaft joined thereto. The longitudinal, torsional and bending vibrations thereof are transmitted to the flywheel and radiated therefrom as a large-area sound source. The flywheel is therefore responsible for a considerable portion of the entire engine noise.

DE A 4339421 describes a two-piece flywheel with primary and secondary masses, joined together via a torsional damping device. The structure described therein is intended merely to overcome the problem of increasing the mass moment of inertia on the primary side. Noise reduction is neither intended not achieved with this construction.

In contrast, the object of the present invention is to design the flywheel with simple means such that its noise contribution to the total engine noise is considerably reduced.

U.S. Pat. No. 1,264,642 certainly describes a riveted flywheel comprising drop-forged parts, but this does not achieve the object according to the invention, since such a flywheel behaves as a homogeneous body from the viewpoint of sound characteristics.

SUMMARY OF THE INVENTION

This object is achieved according to the invention by the features of claims 1 and 9. Advantageous embodiments are described in the dependent claims.

The multi-piece construction of the flywheel can achieve significant reduction of structure-borne sound, an essential aspect being that the parts are joined to each other under initial tension. The parts can be clamped together by bolts, rivets, deep-drawing or a few spot welds. The desired damping effect on propagation of structure-borne sound is achieved in particular in the zone of the contact surfaces of the clamped-together parts.

According to the invention, a particularly inexpensive option for making the flywheel comprises the deformation of a flat plate of sheet steel by deep-drawing, in order to obtain a shallow dish with flat bottom and rounded, shallow rim. In contrast to an embodiment of the flywheel as a cast body, such a deep-drawn part does not have to be balanced, thus permitting further cost savings.

Furthermore, it is provided according to the invention that the second part is also a deep-drawn part, which is made by deep-drawing together with the first part in one working cycle.

According to an advantageous embodiment, the two deep-drawn parts have different material thicknesses; thereby better fit of the surfaces is achieved during deep-drawing.

The second deep-drawn part can cover the first part substantially over the entire surface; alternatively, however, it can cover merely an annular section of the first deep-drawn part; both a central annular section and a peripheral annular section are suitable.

By the fact that the second deep-drawn part is nested partly or completely in a wall recess of the first part, there can be achieved a flywheel surface that is more or less closed, whereby airborne noise is abated and whereby further the joint surfaces are enlarged, thus in turn opposing the propagation of structure-borne sound.

The parts of the flywheel clamped together by individual bolted, welded or riveted points can form two or more layers, and so the flywheel is made as a kind of sandwich structure. One or more middle layers can then be made of sheet steel that is more readily deformable than the outer layer. As a result, not only is it easier to deform the layers in a shared deep-drawing process, but also the damping of structure-borne sound is improved thereby.

BRIEF DESCRIPTION OF THE DRAWINGS

Several embodiments of the invention are explained hereinafter with reference to the drawing, wherein.

DESCRIPTION OF THE PREFERRED EMBODIMENTS

Figure 1:
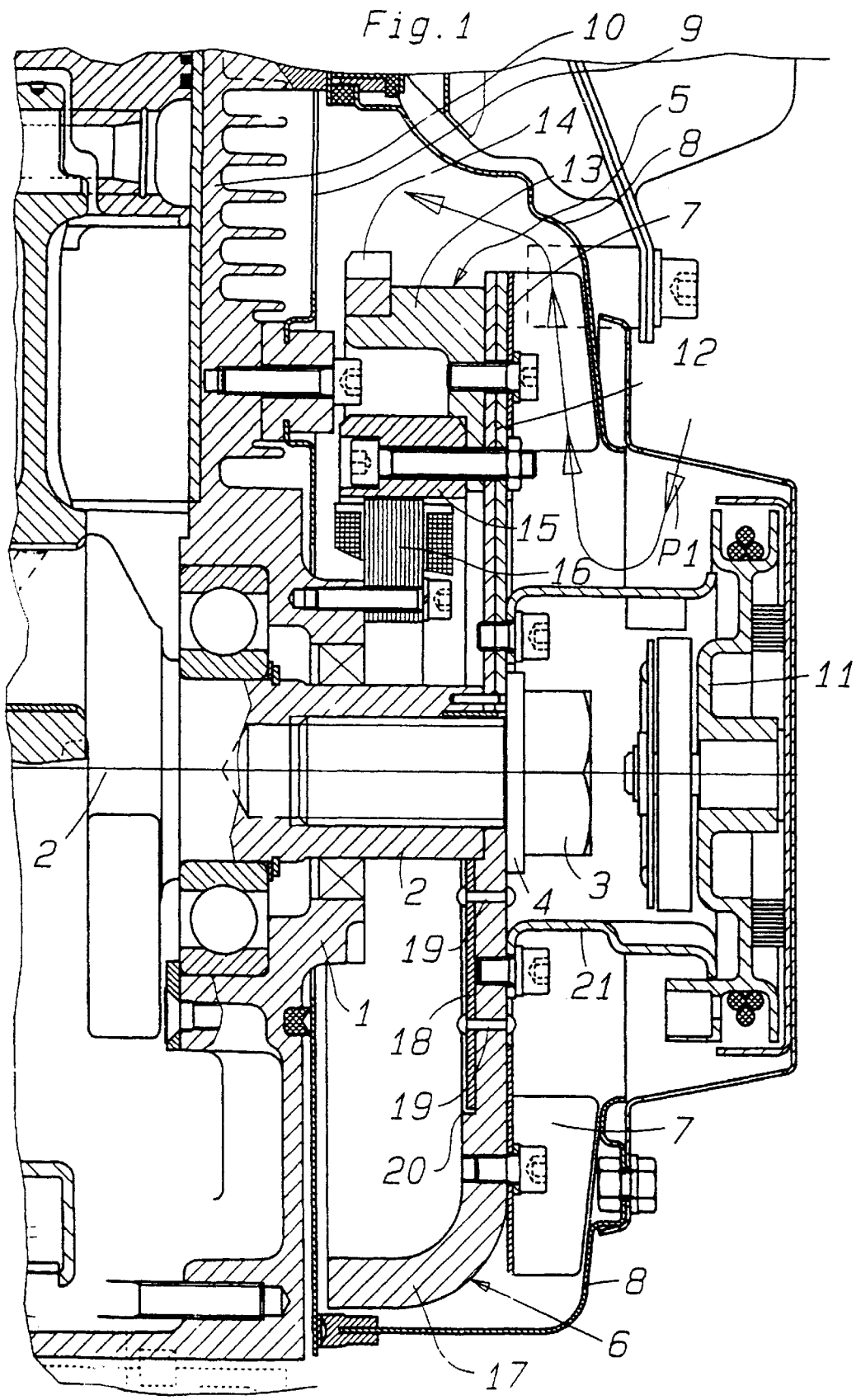
FIG. 1 shows an axial section through one half of the flywheel with a two-piece flywheel comprising two deep-drawn parts bearing on one another over part of the surfaces.
Figure 2:
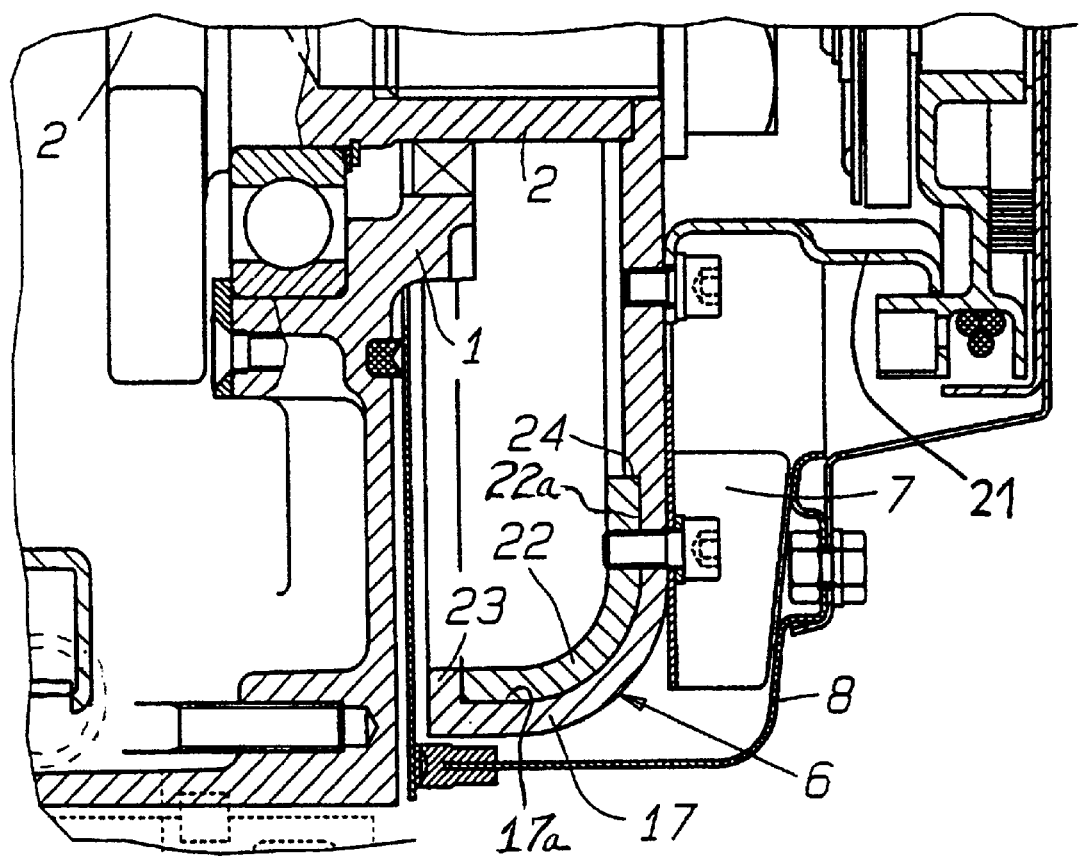
FIGS. 2–3 show an axial section through the lower half of a flywheel comprising two deep-drawn parts clamped together over their entire surface.

FIG. 1 shows a reversing-start flywheel 6, which comprises a first part made as a deep-drawn part 17 from sheet steel and having a first surface 17a, and a second part having a second surface, said second part joined to the first part such that the first and second surfaces bear against one another. Both flywheel parts are made from two deep-drawn parts 17, 22 clamped together with one another. The two parts are formed together from corresponding sheet-steel blanks by a shared deep-drawing process and thereafter are joined to one another by bolts or a few weld spots. To ensure that the inner deep-drawn part 22 comprising the second flywheel part remains joined to the outer deep-drawn part 17 without needing a special joint between the two deep-drawn parts 17, 22, the two deep-drawn parts can be fitted one inside the other as illustrated in FIG. 2, such that the inner deep-drawn part 22 is trapped behind a bent-over rim 23 of the outer deep-drawn part 17. Thereby it becomes possible for the inner deep-drawn part 22 to be nested in clamped condition between the rim 23 and the shoulder 24 of a recess of the outer deep-drawn part 17. In this embodiment of the reversing-start flywheel 6, it is advantageous to provide different material thicknesses for the two deep-drawn parts 17, 22. Moreover, in an alternative version that is not shown, the flywheel can be assembled from more than two deep-drawn sheets in stacked configuration. The peripheral arrangement of the inner deep-drawn part 22 provides the advantage that a large mass moment of inertia can be achieved with a lightweight flywheel.

Figure 3:
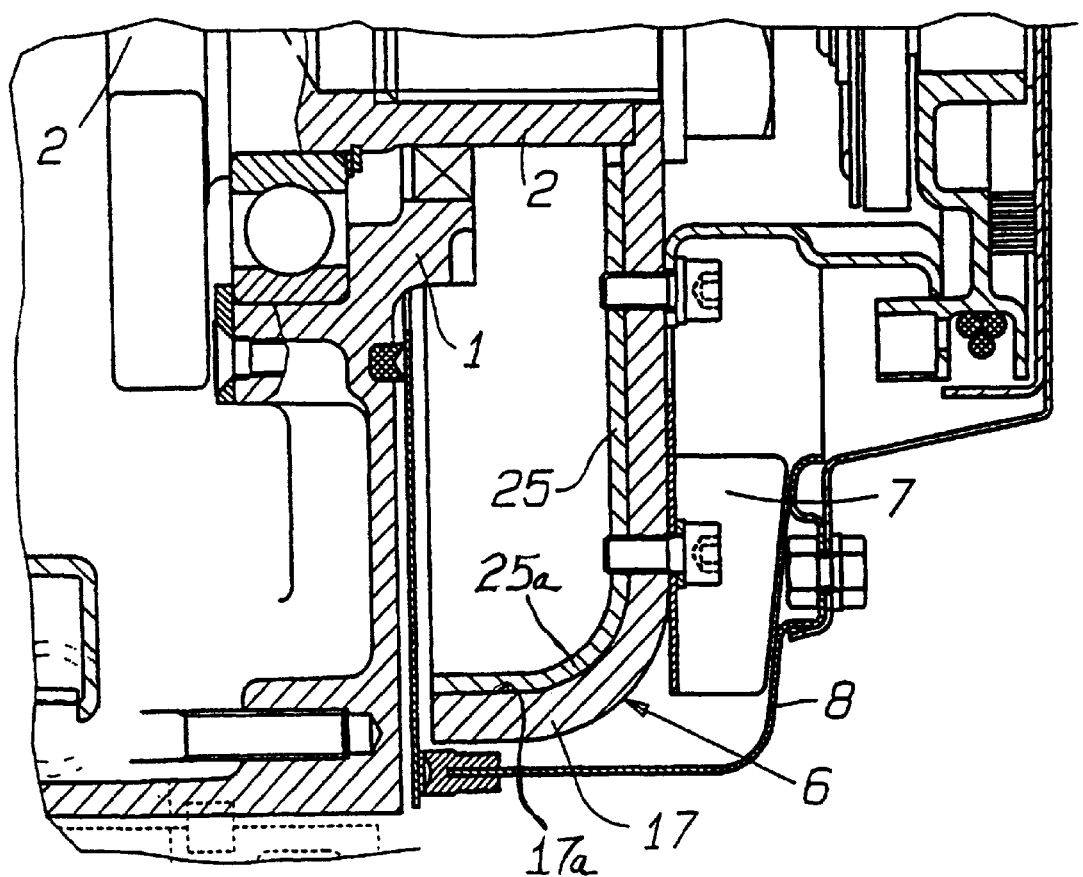

In the embodiment of the reversing-start flywheel 6 shown in FIG. 3, the inner side or surface 17a of the first deep-drawn part 17 is substantially covered by the second surface 25*a* of the second deep-drawn part 25, or in other words the two deep-drawn parts 17, 25 bear against one another substantially over their entire first and second surfaces. In this case the damping effect is extended to the entire flywheel surface and is therefore particularly efficient. Here also the two deep-drawn parts are made by deep-drawing in a shared process. As in the embodiments described hereinabove, it is an essential aspect in this case that the joined-together deep-drawn parts 17, 25 are clamped to one another, for example by rivets, bolts, spot welds or fitting one into the other under tension. The damping effect of the two flywheel parts joined together is particularly good in this case, because their joint is disposed close to the point of connection to the crankshaft 2, which is the source of the structure-borne sound nuisance.

What is claimed is:

1. A process for making a flywheel comprising the steps of:

providing a first flywheel part of sheet steel having a first facing surface, and at least one second flywheel part of sheet steel having a second facing surface, deep drawing said first flywheel part together with said at least one second flywheel part in one shared processing step, clamping said first and at least one second flywheel parts against each other under tension such that the first and second facing surfaces of the first and at least one second flywheel parts bear against each other over an area during assembly.

* * * * *